United States Patent
Hirth et al.

(10) Patent No.: US 12,431,511 B2
(45) Date of Patent: Sep. 30, 2025

(54) METHOD FOR PRODUCING A BIPOLAR PLATE FOR A FUEL CELL

(71) Applicant: Robert Bosch GmbH, Stuttgart (DE)

(72) Inventors: Erhard Hirth, Ellhofen (DE); Harald Bauer, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 910 days.

(21) Appl. No.: 17/628,630

(22) PCT Filed: Jun. 9, 2020

(86) PCT No.: PCT/EP2020/065930
§ 371 (c)(1),
(2) Date: Mar. 11, 2022

(87) PCT Pub. No.: WO2021/013424
PCT Pub. Date: Jan. 28, 2021

(65) Prior Publication Data
US 2022/0271304 A1 Aug. 25, 2022

(30) Foreign Application Priority Data
Jul. 22, 2019 (DE) .................... 10 2019 210 799.0

(51) Int. Cl.
H01M 8/0258 (2016.01)
H01M 8/0234 (2016.01)
H01M 8/0245 (2016.01)

(52) U.S. Cl.
CPC ....... *H01M 8/0258* (2013.01); *H01M 8/0234* (2013.01); *H01M 8/0245* (2013.01)

(58) Field of Classification Search
CPC . H01M 8/0234; H01M 8/0245; H01M 8/0258
USPC ....................................................... 429/457
See application file for complete search history.

(56) References Cited

U.S. PATENT DOCUMENTS

| | | | |
|---|---|---|---|
| 6,007,933 A | 12/1999 | Jones | |
| 2007/0154771 A1 | 7/2007 | Jang et al. | |
| 2008/0318110 A1 | 12/2008 | Budinski et al. | |

FOREIGN PATENT DOCUMENTS

| | | |
|---|---|---|
| CN | 1507665 A | 6/2004 |
| CN | 1921208 A | 2/2007 |
| CN | 101640276 A | 2/2010 |
| CN | 103326045 A | 9/2013 |
| CN | 107004870 A | 8/2017 |

(Continued)

OTHER PUBLICATIONS

Translation of International Search Report for Application No. PCT/EP2020/065930 dated Aug. 20, 2020 (2 pages).

*Primary Examiner* — Kevin P Kerns
(74) *Attorney, Agent, or Firm* — Michael Best & Friedrich LLP

(57) ABSTRACT

A method for producing a bipolar plate (10) for a fuel cell (1), including a plate body (11) for separating the fuel cell (1) from a neighboring fuel cell (1) or a housing. The plate body (11) has a flow field structure (1b) for introducing the reactants into the fuel cell (1). The method includes the following steps: providing a mass (D1) made of electrically conductive particles and a polymer-based adhesive; applying the provided mass (D1) to the plate body (11) of the bipolar plate (10) in the form of the flow field structure (1b); pyrolising the applied mass (D1) which remains on the plate body (11) of the bipolar plate (10) as a shaping element in the form of the flow field structure (1b) and which is connected to the plate body.

10 Claims, 2 Drawing Sheets

(56) References Cited

FOREIGN PATENT DOCUMENTS

| | | | |
|---|---|---|---|
| CN | 107369838 | A | 11/2017 |
| CN | 206834254 | U | 1/2018 |
| CN | 109638310 | A | 4/2019 |
| DE | 112005000365 | T5 | 1/2007 |
| DE | 102012210066 | A1 | 12/2013 |
| EP | 1078408 | A1 | 2/2001 |
| EP | 1195829 | A2 | 4/2002 |
| EP | 2800180 | A1 | 11/2014 |
| JP | 2000215902 | A | 8/2000 |
| JP | 2002093432 | A | 3/2002 |
| JP | 2006331670 | A | 12/2006 |
| JP | 2007242577 | A | 9/2007 |
| JP | 2008117701 | A | 5/2008 |
| JP | 2019075336 | A | 5/2019 |
| WO | 9956333 | A1 | 11/1999 |
| WO | 2019078345 | A1 | 4/2019 |

1) A-A:

2) A-A:

METHOD FOR PRODUCING A BIPOLAR PLATE FOR A FUEL CELL

BACKGROUND OF THE INVENTION

The invention relates to a method for producing a bipolar plate for a fuel cell, to a corresponding bipolar plate, and to a corresponding fuel cell.

Flow field structures for a fuel cell have to date been produced as cavity structures in a millimeter range. For this, the subsequent cavity structures or channels can be milled as indentations into a bipolar plate or applied as elevations or web structures to the bipolar plate. Bipolar plates can also be shaped to produce the cavity structures. A gas distributor structure consisting of particles or fibers, such as a gas diffusion layer (GDL), is then placed onto the cavity structures or channels, which are open in the direction of a membrane of the fuel cell, said layer (GDL) optionally having a microporous layer (MPL) in the direction of the membrane. On stacking, each of the layers must be positioned relative to one another in order for a functional fuel cell to be formed. One known process for producing gas distributor structures is that of printing. Printed gas distributor structures of this kind are connected subsequently to the gastight bipolar plate, by means of adhesive bonding, for example, after a curing operation. At the points of contact between the printed gas distributor structures and the bipolar plate, however, an electrical and thermal resistance is formed.

SUMMARY OF THE INVENTION

The invention in a first aspect provides a method for producing a bipolar plate for a fuel cell. Additionally the invention in a second aspect provides a corresponding bipolar plate, and, in a third aspect, provides a corresponding fuel cell. Additional advantages, features, and details of the invention are apparent from the dependent claims, the description, and the drawings. Here, features and details described in connection with the method of the invention are of course also valid in connection with the bipolar plate of the invention and/or with the fuel cell of the invention, and vice versa in each case, and so reference is or can always be made reciprocally in respect of the disclosure pertaining to the individual aspects of the invention.

The present invention provides a method for producing a bipolar plate for a fuel cell, comprising: a plate body for separating the fuel cell from a neighboring fuel cell or a housing, the plate body comprising a flow field structure for introducing the reactants into the fuel cell. For this, the method of the invention comprises the following steps:
  providing a (first) mass, more particularly a printing paste or a dispersion, of electronically conductive particles and a polymer-based adhesive or binder,
  applying, more particularly printing, the provided mass in the form of the flow field structure to the plate body of the bipolar plate,
  pyrolyzing the applied mass which remains as a shaping element in the form of the flow field structure on the plate body of the bipolar plate and is connected to said body.

The fuel cell of the invention may be assembled into a fuel cell stack having a plurality of stacked repeating units in the form of individual fuel cells, preferably PEM fuel cells.

The bipolar plate of the invention constitutes a cavity structure or a channel structure in a millimeter range for introducing and for coarsely distributing reactants in the fuel cell. It may be used more particularly in conjunction with a planar or flat plate body which is particularly advantageous in terms of production.

Subsequently or together with the flow field structure (coarse channel structure and a high porosity), a porous gas diffusion layer (GDL, fine porosity) and optionally a microporous layer (MPL, extra-fine porosity) can be provided (e.g., co-printed or placed) on the plate body.

The flow field structure of the invention comprises not only the outer cavity structure or channel structure in a millimeter range but also, in particular, an inner porosity for improved gas transport close to the plate body of the bipolar plate. The flow field structure of the invention may be used preferably on the cathode side of the fuel cell.

The bipolar plate of the invention may be suitable for mobile applications, in vehicles, for example, or for stationary applications, in generators, for example.

The concept of the invention is that the entire bipolar plate, comprising the plate body with, applied thereon, the flow field structure of the invention and optionally a subsequent gas diffusion layer (GDL) and/or optionally a subsequent microporous layer (MPL), is pyrolyzed together with the plate body of the bipolar plate. In other words, by means of the method of the invention, the bipolar plate is provided in the form of a pyrolyzed composite component made up of a plate body, a porous (sintered and therefore coherent) flow field structure, and, optionally, a gas diffusion layer and/or a microporous layer. It is possible accordingly to provide a bipolar plate having considerably improved electrical and thermal conductivity between the plate body of the bipolar plate, the porous flow field structure, and, where present, the gas diffusion layer and/or the microporous layer.

The method of the invention enables the use of single-sidedly or double-sidedly planar or flat and therefore inexpensive plate bodies for bipolar plates, requiring no channels or cavity structures that are costly and inconvenient to produce. This entails a considerable cost saving. Plate bodies of this kind may also be continuously and inexpensively printed in the form of a contiguous strip and separated into individual plate bodies not until prior to stacking. In principle, however, it is also conceivable that the plate body of the bipolar plate may have a certain prestructuring, by production, such as embossing, etching or printed application, for example, of negative structures.

The coating of the plate body of the bipolar plate with the first mass, comprising electronically conductive particles, enables a composite to be formed that has very good electrical conductivity. By using suitable printing techniques, such as screen printing, moreover, the surface tolerances of the printed flow field structure can be determined substantially by the accuracy of the printing form, of a screen, for example. If the bipolar plate or one layer has slight corrugation, for example, the corrugation is not intensified but is instead leveled out again by the next screen when the next lamina is printed. Accordingly, even relatively thick multilayer structures can be produced with good thickness tolerance, and this promotes homogenous gas flow and uniform electrical contacting of a catalyst layer.

Where two or more layers are printed, large particles (first mass) may be selected for the particle layers close to the bipolar plate, resulting both in large pores and in large pore interstices in the lamina and ensuring effective dewatering, gas transport, and high stability. In the direction of the membrane, the last, thin printed lamina may comprise finer particles (second mass), as in the case of existing microporous layers, for example. Because the laminas printed are, in accordance with the invention, thin and homogeneous laminas, there is little or no laminar mixing. In the processing of two or more layers, a layer may be formed which has nucleation points for possible condensation of the product water. A further layer may be formed of a material which can additionally be burned out, such as PMMA, for example, which intentionally generates large pores.

The flow field structure may form a corrugated structure, which has a substantially semicircular or arcuate cross section at the webs for example. The semicircular cross section may extend in the direction of the membrane, where it enables a uniform, preferably reduced, tracking force. The flow field structure may have a porosity of around 50% to 70%. The weak points/disruption points on the flow field structure can be monitored directly during printing and therefore virtually eliminated.

Subsequently there are only a few parts needing to be handled during the assembly of the fuel cell, and this considerably facilitates and simplifies the production of the fuel cell.

Furthermore, in a method for producing a bipolar plate for a fuel cell, the invention may provide that a negative structure which can be burned out is applied to the plate body of the bipolar plate before the flow field structure is applied, more particularly applied by printing, to the plate body of the bipolar plate. This negative structure which can be burned out will later decompose during sintering/pyrolysis, decomposing completely or near-completely to form gaseous components. This may be accomplished via suitable choice of binder and particles for printing. In this way, the production of the flow field structure with desired cavity structures or channels can be simplified. In addition, the overprinting of the cavities with a fine-pore particle mixture after the pyrolyzing is substantially facilitated, since this mixture cannot run into the cavities of the gas channels.

Furthermore, in a method for producing a bipolar plate for a fuel cell, the invention may provide that the negative structure which can be burned out is provided as a mixture, more particularly as a drying dispersion, of particles and binder, having a similar softening temperature and/or decomposition temperature, lying preferably below a decomposition temperature of the (first) mass, more particularly of the electronically conductive particles and/or of the polymer-based adhesive or binder of the printing mass. In this way it can be ensured that, after the pyrolyzing of the flow field structure on the plate body of the bipolar plate, the negative structure decomposes completely, in order to expose the desired cavity structures or channels within the flow field structure.

Additionally, in a method for producing a bipolar plate for a fuel cell, the invention may provide that the particles of the negative structure which can be burned out comprise at least one of the following elements: polymethyl methacrylate, polystyrene, polycarbonate and/or polyetheretherketone, and/or that the binder of the negative structure which can be burned out comprises at least one of the following elements: polyethylene and/or polyvinylidene fluoride and/or acrylate adhesive. By means of these materials it is possible to provide a mixture of particles and binder having a similar softening temperature and/or decomposition temperature, lying in turn below a decomposition temperature of the electronically conductive particles of the mass and/or of the polymer binder used there.

Moreover, in a method for producing a bipolar plate for a fuel cell, the invention may provide that the electronically conductive particles of the mass comprise graphite particles and/or graphite fibers, and/or that at least some, preferably more than 10 mass weight fractions, based on the completed lamina, of the electronically conductive particles of the mass have a magnitude of 0.5 μm to 50 μm, preferably 3 μm to 15 μm. A porous flow field structure having an advantageous stability can be achieved in this way. By virtue of the inner porosity, furthermore, a flow field structure of this kind ensures improved distribution of reactants and improved removal of the product water.

Furthermore, in a method for producing a bipolar plate for a fuel cell, the invention may provide that the polymer-based adhesive of the mass (to be applied by coating) comprises at least one of the following elements: acrylate adhesive, polytetrafluoroethylene and/or polyvinylidene fluoride. During the pyrolyzing it is possible, accordingly, to provide for sintering between the electronically conductive particles.

Additionally, in a method for producing a bipolar plate for a fuel cell, the invention may provide that the mass comprises particles which can be burned out, polymethyl methacrylate for example, for forming macroscopic pores within the flow field structure. In this way, the inner porosity within the flow field structure can be promoted.

In addition, in a method for producing a bipolar plate for a fuel cell, the invention may provide that the provided mass is applied in the form of the flow field structure to the plate body of the bipolar plate by a printing technique, more particularly a screen printing technique. This allows a precise technique to be provided for providing the flow field structure.

Furthermore, in a method for producing a bipolar plate for a fuel cell, the invention may provide that after the pyrolyzing of the applied mass in the form of the flow field structure on the plate body of the bipolar plate, a gas diffusion layer and/or a microporous layer is applied, more particularly by printing or placement, to the flow field structure, composed of a second mass, different—more particularly finer—than the (first) mass; in particular, electronically conductive particles of the second mass may be configured as fine soot particles and/or may have an illustrative magnitude of 0.5 μm to 3 μm. In each case, the electronically conductive particles of the second mass may have smaller diameters and/or different shapes from the particles of the first mass. This allows the printing of a plurality of layers having different particle sizes to be enabled, in order to promote improved introduction of reactants into the fuel cell and also to promote a uniform distribution of the reactants over the membrane of the fuel cell.

It is conceivable in the context of the invention, moreover, for a gas diffusion layer and/or a microporous layer to be applied together with the flow field structure of the (first) mass to the plate body of the bipolar plate, in particular by printing. In this way it is possible to enable a particularly inexpensive bipolar plate which is simple to produce.

The present invention further provides a bipolar plate for a fuel cell, comprising: a plate body for separating the fuel cell from a neighboring fuel cell or a housing, the plate body comprising a flow field structure for introducing the reactants into the fuel cell. For this, the invention provides that the flow field structure is applied to the bipolar plate, more particularly by printing, by means of a mass or dispersion of electronically conductive particles and a polymer-based adhesive, and is pyrolyzed (there together with the plate body of the bipolar plate). By means of the bipolar plate of the invention, the same advantages are achieved as those described above in connection with the method of the invention. Reference is presently made to these advantages in their entirety.

The bipolar plate may advantageously be produced by means of a method which can proceed as described above. In this way, the bipolar plate can maintain the particular properties brought about through the method of the invention, such as improved stability, electrical, more particularly electronic, and/or thermal conductivity, and improved distribution of the reactants in the fuel cell, which, moreover, is simple and inexpensive to produce.

The present invention further provides a fuel cell having at least one corresponding bipolar plate. With the aid of the fuel cell of the invention, the same advantages are achieved as those described above in connection with the method of the invention and with the bipolar plate of the invention. Reference is presently made to these advantages in their entirety.

BRIEF DESCRIPTION OF THE DRAWINGS

The invention and developments thereof and also advantages thereof are elucidated in more detail below with reference to drawings. The drawings, in each case schematic, are as follows.

DETAILED DESCRIPTION

In the various figures, identical parts of the invention are always provided with the same reference symbols, which for that reason are generally described only once.

Figure 1:
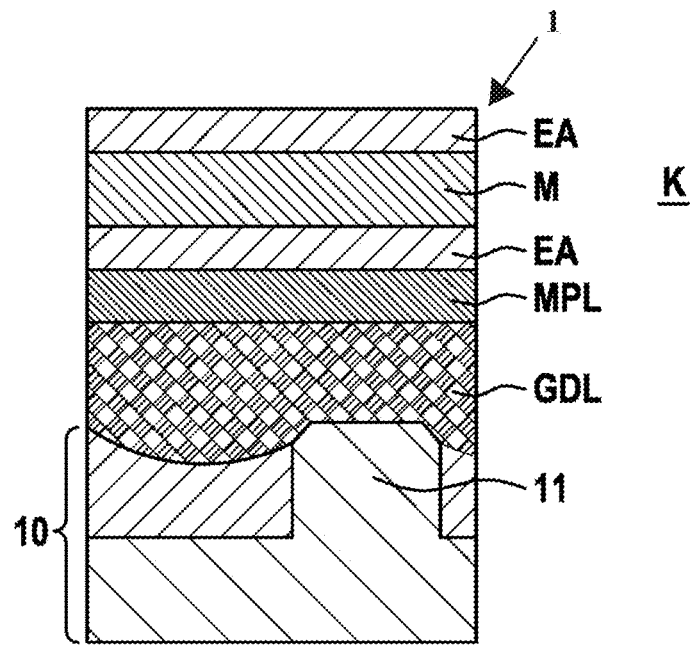
FIG. 1 shows an illustrative construction of a fuel cell in the sense of the invention.
Figure 2:
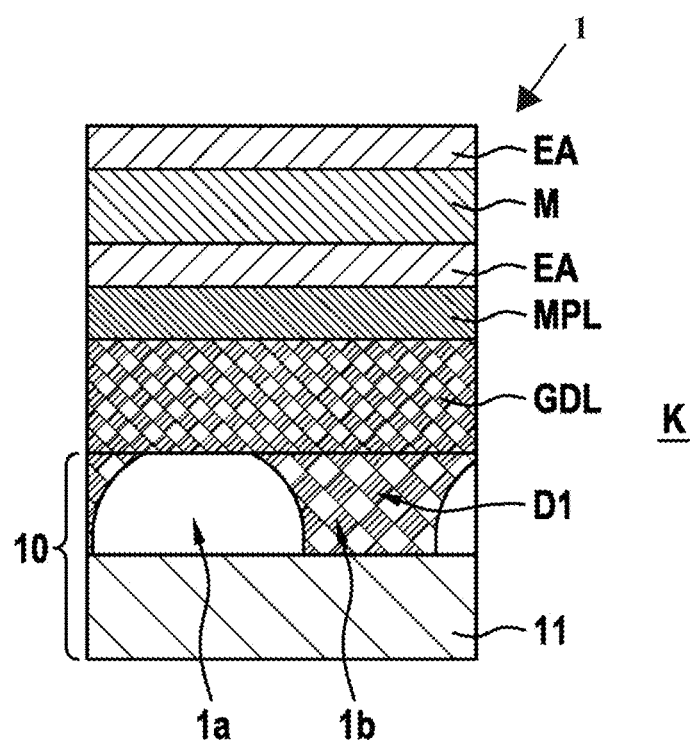
FIG. 2 shows an illustrative construction of a fuel cell having a bipolar plate in the sense of the invention.
Figure 3:
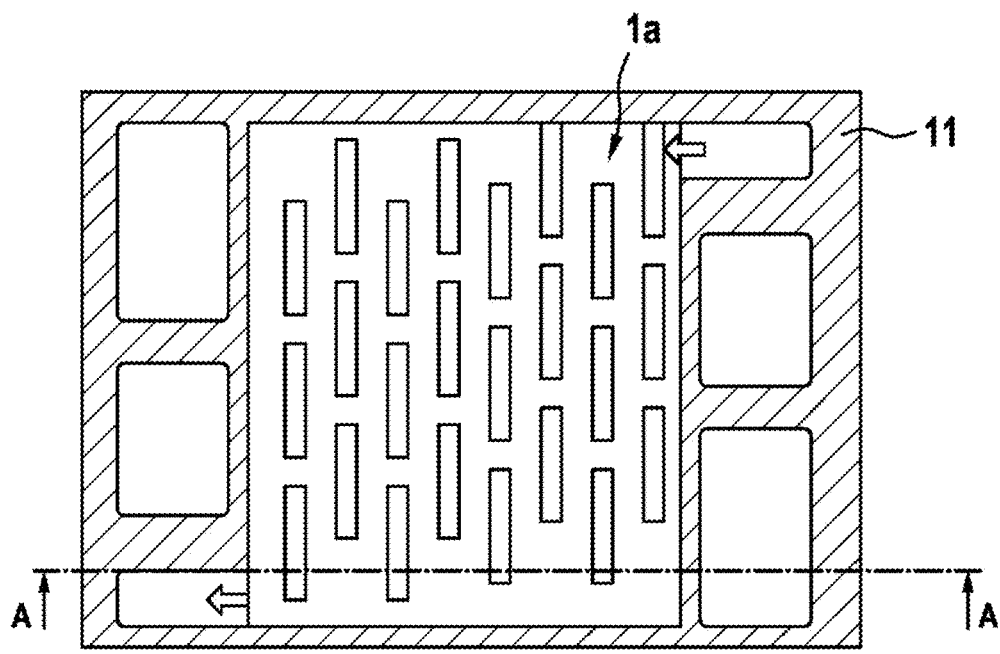
FIG. 3 shows a plan view with multiple side views of a bipolar plate in the sense of the invention.
Figure 3:
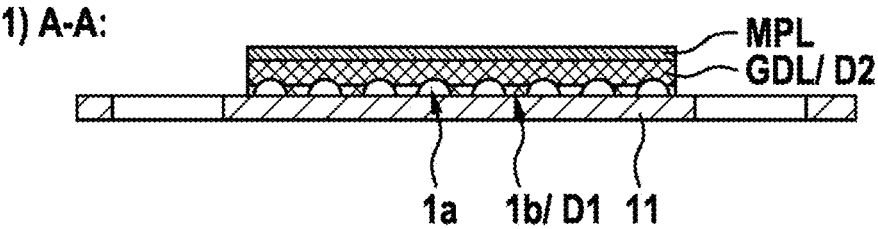
Figure 3:
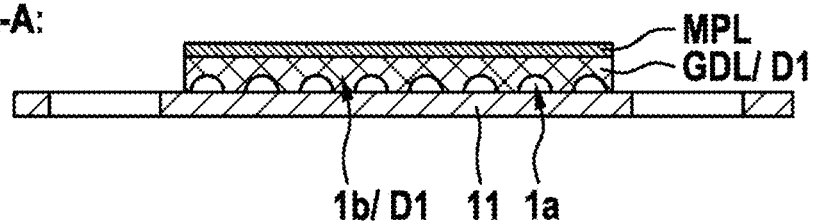

FIGS. 1 to 3 are intended to serve to describe a method of the invention for producing a bipolar plate 10 for a fuel cell 1.

An illustrative fuel cell 1 is shown in FIG. 1. It comprises a membrane M, provided on both sides with one electrode lamina EA each. In the cathode region K of the fuel cell 1, the electrode lamina EA is adjoined by a microporous layer MPL and a gas diffusion layer GDL. A distribution structure for the fuel cell 1 with corresponding cavity structures 1a in a millimeter range is formed by a bipolar plate 10 which comprises cavity structures 1a in the form of elevations. Known bipolar plates 10 may also be provided with cavity structures 1a by forming.

The method of the invention serves for producing a bipolar plate 10 for a fuel cell 1 that is shown in FIG. 2 and that comprises a (preferably planar) plate body 11 for separating the fuel cell 1 from another fuel cell 1 or a housing, the plate body 11 comprising a flow field structure 1b for introducing the reactants into the fuel cell 1.

For this, the method of the invention comprises the following steps:
- providing a (first) mass D1, such as a printing paste or a dispersion, of electronically conductive particles and a polymer-based adhesive,
- applying the provided mass D1 or dispersion in the form of the flow field structure 1b to the plate body 11 of the bipolar plate 10, by a printing technique, more particularly a screen printing technique, for example,
- pyrolyzing the applied mass D1 or dispersion which remains as a shaping element in the form of the flow field structure 1b on the plate body 11 of the bipolar plate 10 and is connected to said body.

The fuel cell 1 of the invention may be stacked to form a fuel cell stack having a plurality of stacked repeating units, in the form of PEM fuel cells, for example.

The bipolar plate 10 of the invention provides a cavity structure or a channel structure in a millimeter range for the coarse distribution of reactants in the fuel cell 1. The bipolar plate 10 of the invention may be used advantageously with a planar or flat plate body 11, which is particularly advantageous to produce.

Subsequently or together with the flow field structure 1b, a porous gas diffusion layer GDL and optionally a microporous layer MPL may be applied, more particularly by co-printing, to the plate body 11 (cf. FIG. 3).

As is evident from FIGS. 2 and 3, the flow field structure 1b of the invention comprises not only the outer cavity structure or channel structure in a millimeter range but also an inner porosity. The flow field structure 1b of the invention may be used preferably in the cathode region K of the fuel cell 1, in order to promote the removal of the product water there.

According to the invention, the bipolar plate 10 with the flow field structure 1b of the invention and with optionally a subsequent gas diffusion layer GDL and/or optionally a subsequent microporous layer MPL is pyrolyzed together with the plate body 11. In this way it is possible to provide a bipolar plate 10 having improved electrical, more particularly electronic, and thermal connection properties between the plate body 11, the porous flow field structure 1b, and the gas diffusion layer GDL and/or the microporous layer MPL.

As indicated by FIGS. 2 and 3, the flow field structure 1b may have a corrugated structure, having a semicircular cross section at the webs, for example. In this way it is possible to enable a uniform, preferably reduced, tracking force on the membrane M. The flow field structure 1b may have a porosity of approximately 50% to 70%.

As indicated schematically by FIGS. 2 and 3, before the flow field structure 1b is applied, more particularly by printing, to the plate body 11 of the bipolar plate 10, a negative structure 1a which can be burned out may be applied to the plate body 11 of the bipolar plate 10, this structure being completely or near-completely decomposed subsequently, during the pyrolyzing, into gaseous components. The negative structure 1a which can be burned out may be provided as a mixture, such as a drying dispersion, of particles and binder, having a similar softening temperature and/or decomposition temperature, lying preferably below a decomposition temperature of the electronically conductive particles and/or of the polymer-based adhesive of the mass D1. The particles of the negative structure 1a which can be burned out may comprise at least one of the following elements: polymethyl methacrylate (PMMA), polystyrene (PS), polycarbonate (PC) and/or polyetheretherketone (PEEK). The binder of the negative structure 1a which can be burned out may comprise at least one of the following elements: polyethylene glycol (PEO), polyvinylidene fluoride (PVDF) and/or acrylate adhesive.

The electronically conductive particles of the mass D1 may in turn comprise graphite particles and/or graphite fibers, and the electronically conductive particles of the mass D1 may have a magnitude of 10 µm to 50 µm. The polymer-based adhesive of the mass D1 may comprise at least one of the following elements: acrylate adhesive and/or polytetrafluoroethylene (PTFE) and/or polyvinylidene fluoride (PVDF).

Optionally it is conceivable that the mass D1 may comprise particles which can be burned out, polymethyl methacrylate (PMMA) for example, for forming macroscopic pores within the flow field structure 1b.

As shown by FIG. 3 in the side view 1), a gas diffusion layer GDL and/or a microporous layer MPL may be applied by printing or placing to the flow field structure 1b, composed of a second mass D2, which is different, more particularly finer, than the (first) mass D1, after the pyrolyzing of the flow field structure 1b on the plate body 11 of the bipolar plate 10. In this case it is conceivable that the electronically conductive particles of the finer mass D2 may have a smaller particle size than the (first) mass D1. It is therefore possible to enable a bipolar plate 10 having a plurality of layers and having different particle sizes and pore sizes, in order to promote improved introduction of reactants into the fuel cell 1 and subsequently a uniform distribution of the reactants over the membrane M of the fuel cell 1.

As shown by FIG. 3 in the side view 2), a gas diffusion layer GDL and/or a microporous layer MPL may be printed together with the flow field structure 1b of the (first) mass D1 on the plate body 11 of the bipolar plate 10. Accordingly it is possible to enable a particularly inexpensive and simple bipolar plate 10.

The above description of the figures describes the present invention exclusively in the context of examples. It will be appreciated that, insofar as it makes technical sense, individual features of the embodiments may be freely combined with one another without departing from the scope of the invention.

What is claimed is:

1. A method for producing a bipolar plate (10) for a fuel cell (1), comprising:
   a plate body (11) for separating the fuel cell (1) from a neighboring fuel cell (1) or a housing,
   the plate body (11) having a flow field structure (1b) for introducing reactants into the fuel cell (1),
   wherein the method comprises:
   providing a mass (D1) of electronically conductive particles and a polymer-based adhesive,
   applying the mass (D1) in a form of the flow field structure (1b) to the plate body (11) of the bipolar plate (10),
   pyrolyzing the mass (D1) which remains as a shaping element in the form of the flow field structure (1b) on the plate body (11) of the bipolar plate (10) and is connected to said body, and
   applying a negative structure (1a) to the plate body (11) of the bipolar plate (10) before applying the mass (D1) in the form of the flow field structure (1b) to the plate body (11) of the bipolar plate (10),
   wherein pyrolyzing the mass (D1) burns out the negative structure (1a).

2. The method as claimed in claim 1, wherein the negative structure (1a) which is burned out is provided as a mixture of particles and binder having a similar softening temperature and/or decomposition temperature lying below a decomposition temperature of the electronically conductive particles of the mass (D1).

3. The method as claimed in claim 2, wherein the particles of the negative structure (1a) which are burned out comprise at least one of the following elements: polymethyl methacrylate (PMMA), polystyrene (PS), polycarbonate (PC) and/or polyetheretherketone (PEEK),
and/or wherein the binder of the negative structure (1a) which is burned out comprises at least one of the following elements: polyethylene glycol (PEO), and/or polyvinylidene fluoride (PVDF) and/or acrylate adhesive.

4. The method as claimed in claim 1, wherein the electronically conductive particles of the mass (D1) comprise graphite particles and/or graphite fibers,
and/or wherein at least some of the electronically conductive particles of the mass (D1) have a magnitude of 10 μm to 50 μm.

5. The method as claimed in claim 1, wherein the polymer-based adhesive of the mass (D1) comprises at least one of the following elements: acrylate adhesive and/or polytetrafluoroethylene (PTFE) and/or polyvinylidene fluoride (PVDF).

6. The method as claimed in claim 1, wherein the mass (D1) comprises particles which are burned out for forming macroscopic pores within the flow field structure (1b).

7. The method as claimed in claim 6, wherein the particles which are burned out include polymethyl methacrylate (PMMA).

8. The method as claimed in claim 1,
wherein the mass (D1) is applied in the form of flow field structure (1b) to the plate body (11) of the bipolar plate (10) by a printing technique.

9. The method as claimed in claim 1,
wherein after the pyrolyzing of the mass (D1) in the form of the flow field structure (1b) on the plate body (11) of the bipolar plate (10), a gas diffusion layer (GDL) and/or a microporous layer (MPL) are/is applied to the flow field structure (1b), composed of a second mass (D2) which is different than the mass (D1),
or wherein a gas diffusion layer (GDL) and/or a microporous layer (MPL) are/is applied together with the flow field structure (1b) of the mass (D1) to the plate body (11) of the bipolar plate (10).

10. A method for producing a bipolar plate (10) for a fuel cell (1), comprising:
   a plate body (11) for separating the fuel cell (1) from a neighboring fuel cell (1) or a housing,
   the plate body (11) having a flow field structure (1b) for introducing reactants into the fuel cell (1),
   wherein the method comprises:
   providing a mass (D1) of electronically conductive particles and a polymer-based adhesive,
   applying the mass (D1) in a form of the flow field structure (1b) to the plate body (11) of the bipolar plate (10),
   pyrolyzing the mass (D1) which remains as a shaping element in the form of the flow field structure (1b) on the plate body (11) of the bipolar plate (10) and is connected to said body,
   wherein after the pyrolyzing of the mass (D1) in the form of the flow field structure (1b) on the plate body (11) of the bipolar plate (10), a gas diffusion layer (GDL) and/or a microporous layer (MPL) are/is applied to the flow field structure (1b), composed of a second mass (D2) which is different than the mass (D1),
   or wherein a gas diffusion layer (GDL) and/or a microporous layer (MPL) are/is applied together with the flow field structure (1b) of the mass (D1) to the plate body (11) of the bipolar plate (10).

* * * * *